July 23, 1963 J. SCHNEIDERMAN 3,098,975
EMERGENCY RADIO RECEIVER
Filed Jan. 25, 1960
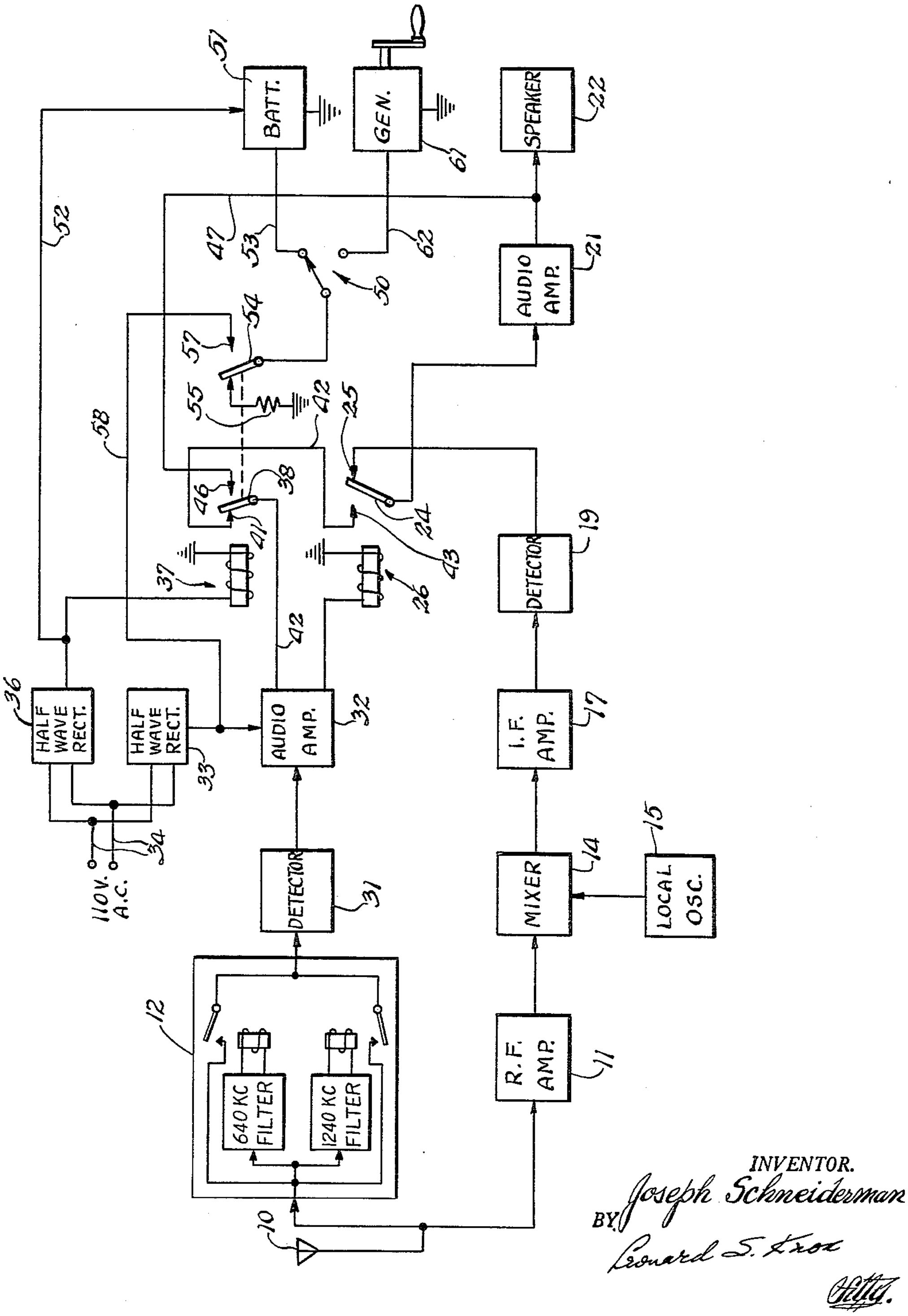
INVENTOR.
Joseph Schneiderman
BY Leonard S. Knox
Atty.

United States Patent Office 3,098,975
Patented July 23, 1963

3,098,975
EMERGENCY RADIO RECEIVER
Joseph Schneiderman, 6649 N. Rockwell St., Chicago, Ill.
Filed Jan. 25, 1960, Ser. No. 4,278
3 Claims. (Cl. 325—466)

This invention relates to a special purpose radio receiver adapted to receive broadcasts directed to the public generally during local emergencies.

For example, it is well known that the United States Government, acting through the Federal Communications Commission has issued a directive that, in the event of enemy attack, all broadcasting stations shall terminate their ordinary operations and shall then switch to two specified channels for disseminating information concerning the attack and providing instructions for conduct of the populace during the attack. These channels operate on 640 kc. and 1240 kc. and are commonly termed Conelrad frequencies.

Since it must be assumed that only a small percentage of potential listeners have a radio turned on at any particular time it follows that termination of a program and switching to the emergency frequencies will be fruitless insofar as concerns those persons not then listening to a program of any sort.

Accordingly it is the primary object of my invention to provide a radio receiver adapted to be turned on continuously and to be initiated into active operation automatically upon reception of one or the other of several specified emergency frequencies.

Another object lies in providing a receiver in accordance with the foregoing which is arranged for minimum current consumption.

A further object is to provide a receiver as aforesaid which is devoid of moving parts except for the armatures of movable relays.

An additional object is to provide such a receiver which will continue to function notwithstanding failure of the municipal power supply as may readily occur as a direct result of enemy attack or sabotage.

Other objects will become apparent from the ensuing description which, taken with the accompanying drawing, discloses a preferred mode of carrying the invention into practice.

The single FIGURE of the drawing is a schematic illustration of the circuitry including certain components in block form.

The invention is illustrated as permanently related in a single chassis with a conventional broadcast receiver or as an adjunct thereto to be plugged in, although, as the description proceeds, it will become evident that the invention may be self-contained, subject to slight variation in the arrangement shown.

The antenna 10 is connected in common with what are sometimes referred to herein as a "first circuit" and a "second circuit" although each may be provided with an individual antenna. For purposes of the description herein the first circuit is illustrated as of the super-heterodyne type and may, optionally, be for the reception of an audio modulated carrier or one which is frequency-modulated. Where herein, in relation to the first circuit, I use the term "detector" I intend to include the discriminator separating the intelligence carried on a frequency-modulated wave.

Within the present concept the first circuit may be turned "on" or "off" without affecting the function of the second circuit. However assuming the reception of ordinary broadcast signals, i.e. transmitted on other than the assigned emergency frequencies, and assuming the first circuit is turned "on," the components thereof then active will comprise a radio frequency amplifier 11, a mixer 14, a local oscillator 15 for customary super-heterodyne reception, an intermediate frequency amplifier

17, a detector stage 19, an audio amplifier 21 and a speaker 22. Feed from the detector to the input of the audio amplifier is via the tongue 24 and back contact 25 of a relay 26 to be referred to more particularly in what follows. As just described the components 11, 14, 15, 17, 19, 21 and 22 constitute a common type of receiver. If desired the same may take the modified form of a receiver for frequency modulated broadcasts as will be understood, but will, in any case, include the speaker 22. It will become apparent that the speaker 22 is adapted to serve the second circuit of the illustrated arrangement thereby economizing substantially on the bulk and the cost of the unit.

Turning now to the remainder of the diagram including the second circuit a switching device 12 incorporates filter circuits adapted to turn on the emergency receiver upon reception of one of the allocated special frequencies, e.g. 640 kc. or 1240 kc. or to turn the same off in the absence of such frequencies. The foregoing filter circuits are represented as portions of the device 12 and are of the type which will pass only the frequencies to which they are tuned. The simple relays taking the output of the filters are the "on" and "off" elements acting to switch the antenna to the detector 31 upon reception of either of said two frequencies. The filter circuits will operate to block all but the frequency or frequencies for which they are tuned and, when placed in resonance by a specified frequency, will pass sufficient current to operate a relay (not shown) connecting the antenna 10 to a detector 31. Desirably this detector is of the "wide open" type, e.g. a crystal or a simple diode capable of rectifying any of the anticipated special frequencies to provide input to an audio amplifier 32.

Power to operate the audio amplifier 32 is supplied from a half-wave rectifier 33 fed from the regular A.C. power lines, as indicated at 34. A second half-wave rectifier 36 supplies power to the winding of a relay 37, the circuit being completed to ground, whereby to maintain the armature 38 thereof continuously against its front contact 41. Thus a circuit is conditioned from the amplifier 32, over lead 42, armature 38, contact 41 and lead 42 to the front contact 43 of the relay 26. The back contact 46 of the armature 46 is connected, via a lead 47, to the speaker 22.

From the foregoing it will have become evident that, upon reception of one of the emergency frequencies the device 12 will transfer from "off" to "on" whereby to energize the relay 26 and to swing the armature 24 thereof from contact 25 to contact 43. Thus the detector 19 is disconnected from the amplifier 21 and speaker 22 and the amplifier 32 is connected to the amplifier 21 and speaker 22 for audible reception of the broadcast on the emergency frequency. Such condition will subsist so long as the emergency carrier is being received. Upon cessation thereof the original condition will be restored.

If desired, interruption of the first circuit by the relay 26 may be effected intermediate the amplifier 21 and the speaker 22 assuming, of course that the amplifier 32 is arranged to deliver sufficient power to the speaker 22 in the absence of the amplifier 21.

Inasmuch as an enemy attack or sabotage may be expacted to interrupt power available at 34 and transmission of the emergency broadcast will continue on an emergency generator or battery at the transmitter, arrangements are made to maintain the invention receiver operative under such circumstances.

To this end I provide a battery 51 connected for constant charge to the half-wave rectifier 36 through a conductor 52 and returned through a lead 53 and one pole of a single-pole, double-throw switch 50 to a second armature 54 of the relay 37 and thence to ground through a bleeder resistor 55. Thus, upon power failure, armature 54 will swing to its back contact 57 to connect the battery to amplifier 32 through a lead 58. Alternatively, a hand-cranked or other form of generator 61 may be connected through a lead 62 to the other pole of the switch 50. Assuming failure or inadequacy of the battery 51 the switch 50 is thrown to the other pole.

In the event of failure of the A.C. supply at 34 output of the second circuit is fed directly to the speaker 22 via the lead 47.

In order to avoid interaction between rectifier circuits and the battery on relay operation two rectifiers have been shown. However any other type of power supply may be substituted with the proviso that the same is compatible with the emergency power supply, e.g. battery or stand-by generator.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

I claim:

1. A radio receiver adapted to receive conventionally broadcast programs and, in the alternative, to receive emergency intelligence carried on one or more predetermined carrier frequencies comprising: an antenna, a frequency-responsive device having an input connected to the antenna, said device including filter circuits one individual to each said frequency, switching means connected to and actuable by the output of the filter circuit then active in accordance with the one of the frequencies then being received, a detector adapted to be connected to the then-active filter circuit through said switching means for demodulating the intelligence on the then received frequency, an audio amplifier receiving the demodulated signal from the detector, relay means actuated by the output of said amplifier, a speaker continuously connected to a source of power, circuit means connected between said relay means and said speaker for activating the speaker upon energization of said relay means to render audible the intelligence carried on the received frequency, a conventional broadcast receiver adapted to utilize said speaker connected to said antenna including a second audio amplifier providing an output to said speaker, and circuit means between said second amplifier and relay means to connect said speaker to said second amplifier in the absence of any of said predetermined carrier frequencies.

2. A radio receiver adapted to receive conventially broadcast programs and, in the alternative, adapted to render audible emergency intelligence carried on one or more predetermined carrier frequencies comprising: an antenna to receive said programs and frequencies, a device receiving the output of the antenna including filter circuits one individual to each of said carrier frequencies and tuned respectively thereto, a detector for separating the carried intelligence from the carrier frequency, a first amplifier for amplifying the demodulated signal, normally-open switching means closable upon passage through one of said filter circuits of one of said frequencies to connect the then active filter circuit to the detector, another circuit connected to said antenna responsive to a specified band of conventional broadcast signals received on said antenna, said other circuit including means to demodulate said conventional signals and to deliver the demodulated output to a speaker, said speaker being normally connected to said last mentioned output, relay means responsive to the output of said first amplifier normally connecting the demodulated signal in the said other circuit to the speaker and activated by the output of said first amplifier to deliver the demodulated intelligence carried on said one frequency to said speaker and to disconnect the demodulated conventional signals therefrom.

3. A radio receiver comprising: one circuit adapted to operate on a specified band of carrier frequencies carrying conventional broadcast programs, said one circuit including in order a radio frequency amplifier, a local oscillator including a mixer, an intermediate frequency amplifier, a detector stage, an audio frequency amplifier and a speaker, another circuit adapted for operation on one or more specified emergency frequencies carrying intelligence, an antenna connected in common to both circuits, said other circuit having a frequency-responsive device, said device including filter circuits one individual to each of said emergency frequencies to provide a resonant output and normally-open switching means, said switching means being actuated by said resonant output to operate from normally-open to closed condition upon application to said filter circuits of one of said specified frequencies, a detector adapted to demodulate the emergency carrier frequency then being received connected to said switching means when the same is closed, an audio amplifier connected to the output of said detector, relay means operable by the output of said second audio amplifier, circuit means connecting said relay means to the respective outputs of said first and second audio amplifiers to disconnect the said first audio amplifier from the speaker to silence the broadcast program and to connect said second audio amplifier to said speaker for audible reception of the emergency signals.

References Cited in the file of this patent

UNITED STATES PATENTS

| | | |
|---|---|---|
| 2,330,241 | Roberts | Sept. 28, 1943 |
| 2,617,923 | Rekart | Nov. 11, 1952 |
| 2,820,892 | Spangler | Jan. 21, 1958 |
| 2,879,383 | Powell | Mar. 24, 1959 |

OTHER REFERENCES

"A Conelrad Monitor," Radio and Television News, Jan., 1955, pp. 99 and 100.